(12) United States Patent
Tsai

(10) Patent No.: US 7,679,670 B2
(45) Date of Patent: Mar. 16, 2010

(54) DIGITAL CAMERA MODULE WITH MANUAL FOCUSING FUNCTION

(75) Inventor: Ming-Chiang Tsai, Tucheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1043 days.

(21) Appl. No.: 11/307,793

(22) Filed: Feb. 22, 2006

(65) Prior Publication Data
US 2006/0209205 A1    Sep. 21, 2006

(30) Foreign Application Priority Data
Mar. 19, 2005    (CN)    .................... 2005 2 0056118 U

(51) Int. Cl.
H04N 5/225    (2006.01)

(52) U.S. Cl. ...................................... 348/360; 348/373

(58) Field of Classification Search ................. 348/373, 348/374, 360; 359/694; 396/71–83, 144
See application file for complete search history.

(56) References Cited

U.S. PATENT DOCUMENTS
3,329,075 A * 7/1967 Padelt .......................... 359/825
2006/0056058 A1* 3/2006 Chong et al. ................. 359/694

FOREIGN PATENT DOCUMENTS
SU    1592825 A * 9/1990

* cited by examiner

*Primary Examiner*—Tuan Ho
(74) *Attorney, Agent, or Firm*—Steven M. Reiss

(57) ABSTRACT

A digital camera module (100) with a manual focusing function includes: a base (10), a barrel (40) and at least one rod (50). The barrel is received in the base and is connected with the base. The rod is connected with the barrel and the base so that when the barrel is rotated relative to the base, the barrel is caused to slide axially relative to the base. The manual focusing operation of the digital camera module is simple. In addition, the digital camera module has a compact structure and power-efficient.

15 Claims, 2 Drawing Sheets

DIGITAL CAMERA MODULE WITH MANUAL FOCUSING FUNCTION

FIELD OF THE INVENTION

The present invention relates generally to a camera module with a manual focusing function, and more particularly, to a small-sized digital camera module with a manual focusing function and to a portable electronic device, such as a mobile phone or a Personal Digital Assistant (PDA), having such a camera module mounted therein.

DESCRIPTION OF RELATED ART

With the development of wireless communication technologies, there are many cases where digital cameras are now mounted in mobile phones or PDAs.

Generally, digital cameras are image recording media capable of photographing a plurality of still images without using film. Such a digital camera typically uses an image pickup device, which is a kind of semiconductor device, such as a Charge Coupled Device (CCD) or Complementary Metal Oxide Semiconductor (CMOS). In the digital camera, an object image formed on the image pickup device through a lens is converted into an electrical signal by the image pickup device, and the electrical signal is stored as a digital signal, for example, either in the camera unit or in a mobile phone or PDA in which the digital camera is mounted.

Since the digital camera is to be mounted in a small mobile phone or PDA, a fixed focus lens module is usually used to facilitate mounting thereof. However, images photographed by a digital camera module with a fixed focus lens module tend to be of poor quality. This is partly due to the fixed focus lens, which is incapable of adjusting distance between the lens and the image pickup device to make a clearer image when photographing objects at different distances from the camera.

A typical focusing structure has a focusing adjusting apparatus using a step motor. This structure is relatively large and makes the camera structure very complicated. Furthermore, the step motor consumes a substantial amount of power, especially considering the limit amount of power that can be stored in the typical battery system of a mobile phone or PDA. As such, step motors are not suitable for use in mobile phones or PDAs, which need to be small and power saving, and this structure is not suitable for a portable electronic device.

Therefore, a digital camera with a manual focusing function is desired in order to overcome the above-described shortcomings.

SUMMARY OF INVENTION

In one embodiment thereof, a digital camera module with a manual focusing function includes: a base, a barrel and at least one rod. The barrel is movably received in the base. The rod is connected with the barrel and the base so that when the barrel is rotated relative to the base, the barrel is caused to slide axially relative to the base. The manual focusing operation of the digital camera module is simple. In addition, the digital camera module has a compact structure and is power-efficient.

Other advantages and novel features will become more apparent from the following detailed description when taken in conjunction with the accompanying drawings.

BRIEF DESCRIPTION OF DRAWINGS

Many aspects of the digital camera module with the manual focusing function can be better understood with reference to the following drawings. The components in the drawings are not necessarily to scale, the emphasis instead being placed upon clearly illustrating the principles of the digital camera module with the manual focusing function. Moreover, in the drawings, like reference numerals designate corresponding parts throughout the several views.

DETAILED DESCRIPTION

Figure 1:
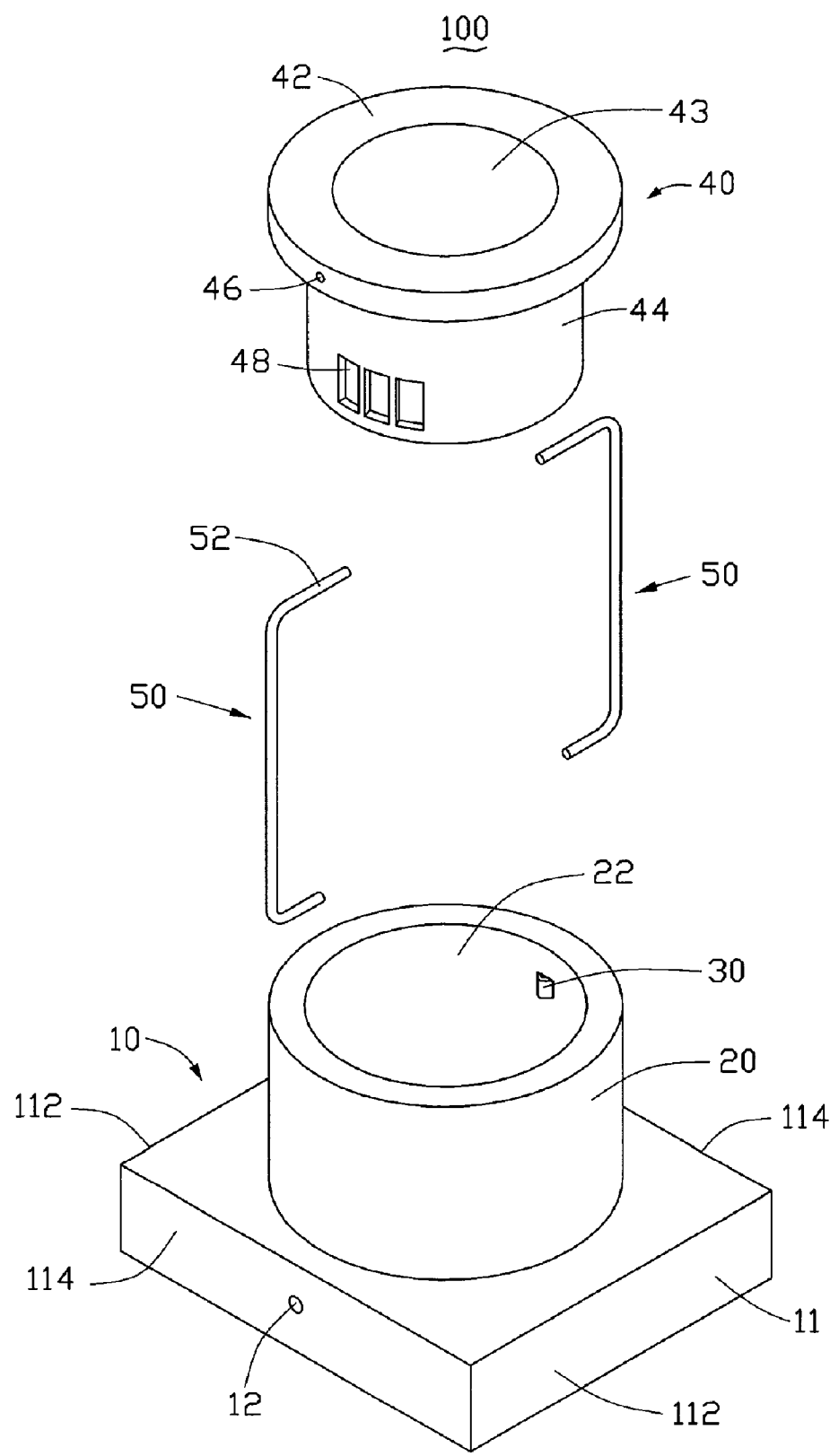
FIG. 1 is an exploded, isometric view of an embodiment of a digital camera module with a manual focusing function.

Referring now to the drawings, FIG. 1 shows a digital camera module 100 with a manual focusing function, according to a preferred embodiment. The digital camera module 100 is adapted for use in a portable electronic device such as a mobile phone or a Personal Digital Assistant (PDA), but the compact nature thereof could prove useful in compact digital camera units, digital camcorders or regular film cameras as well. The digital camera module 100 includes a base 10, a barrel 40 and two rods 50.

The base 10 has a cavity defined therein, which can rotatably and slidably receive the barrel 40. The cavity can be formed in several different ways. In this embodiment, the base 10 includes a base seat 11 and a sleeve 20 mounted on or in the base seat 11. The sleeve 20 forms the cavity of the base 10. The sleeve 20 has an elastic element 30 therein. The base seat (i.e., holder) 11 is substantially rectangular in shape, and includes two opposite end walls 112 and two opposite sidewalls 124. Each sidewall 124 has a first pin hole 12 defined in a middle thereof. An image sensor 14 is fixed on or in the base seat 11. The image sensor 14 can be a charge-coupled device (CCD) or a complementary metal-oxide semiconductor (CMOS). The image sensor 14 may transform light signals to electronic signals.

The sleeve 20 is substantially a hollow cylinder with two open ends so that light beams can be transmitted therethrough. One open end of the sleeve 20 is mounted (i.e., fixed) on or in the base seat 10, and surrounds the image sensor 14. The other open end of the sleeve 20 receives the barrel 40. An axis of the sleeve 20 aligns with a center of the image sensor 14 such that the sleeve 20 is capable of routing the input light beams. The sleeve 20 has an inner periphery wall 22 thereof.

An elastic positioning element 30 is bent into a hook (i.e., clasp, catch), and is mounted in or on the inner wall 22 of the sleeve 20. The positioning element 30 is preferably made from an elastic material, such as a metal or a plastic which displays elastic qualities.

The barrel 40 includes a flange 42 and a barrel body 44 formed together. The flange 42 is formed at a top end of the barrel body 44. The flange 42 has a through hole 43 defined in a middle thereof. The barrel body 34 is a hollow cylinder, and the through hole 43 communicates with the barrel body 44 so that light beams can be transmitted therethrough. An outer diameter of the barrel body 44 is smaller than an inner diameter of the sleeve 20 so that the barrel 40 may be received in the sleeve 20 and slide relative to the sleeve 20 axially. Several lens elements (not shown) are disposed in the barrel 40, and receives light rays that enter from the outside. An outside circumferential wall of the flange 42 has two diametrical second pin holes 46 defined therein. The barrel body 44 has several evenly arranged apertures (i.e. slots, openings) 48 defined in an outside wall thereof. Along an axial direction of the camera module 100, a length of the aperture 48 is longer than that of the positioning element 30. The apertures 48 are designed with parallel and equal distribution. Alternatively, the apertures 48 can also be designed with a parallel stepped distribution. The number of apertures 48 is generally more than one. The position of the elastic element 30 corresponds to that of the apertures 48, and may slide into a given aperture 48 and lock into the given aperture 48.

Each rod (i.e., pole) 50 is a long cylinder and is made from an elastic material, such as a metal or plastic. The rod 50 has a pair of connecting ends 52 bent at two free end portions thereof. The connecting end 52 is respectively inserted into the first hole 12 and the second hole 46 so that the barrel 40 is supported above the sleeve 20. The rods 50 cause the barrel 40 to move so that the distance between the barrel 40 and the base 10 is changed.

Figure 2:
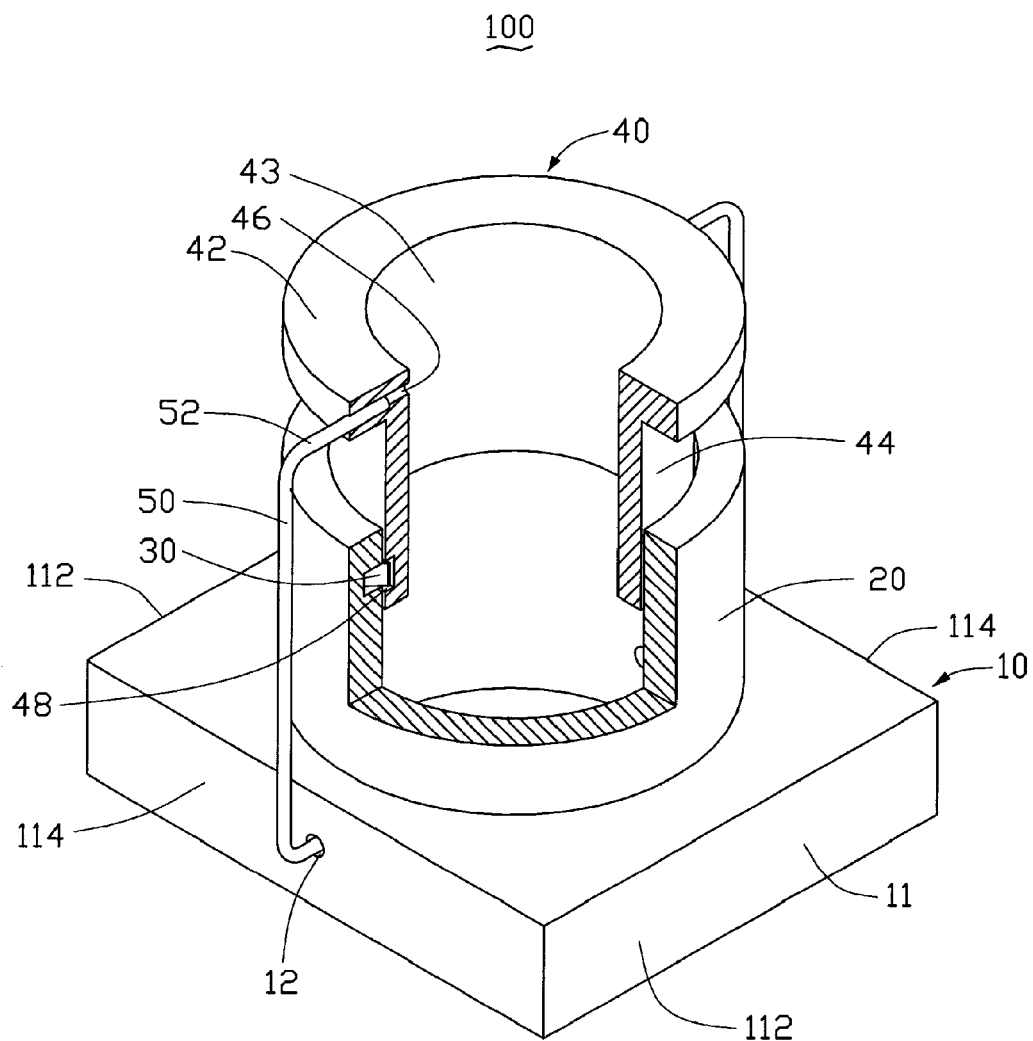
FIG. 2 is an assembled, partially cut-away, isometric view of the digital camera with the manual focusing function as shown in FIG. 1.

In assembly, referring now to FIG. 2, the sleeve 20 is fixed in the base seat 11 by means of adhesion and/or welding, with the image sensor 14 aligning with the open ends of the sleeve 20. Then, the elastic element 30 is mounted in the inner wall 22 of the sleeve 20 by means of screws and/or welding. Several lens elements are received in the barrel body 43 of the barrel 40. After that, the barrel 40 is inserted into the sleeve 20, with the flange 42 located outside the sleeve 20. At the same time, the elastic element 30 in the sleeve 20 engages into one of apertures 48 of the barrel 40. Finally, the connecting ends 52 of each rod 50 respectively are inserted into the first pin hole 12 and the second pin hole 46 so as to connect the rod 50 with the barrel 40 and the base seat 11 together.

In use, the digital camera module 100 is fitted within a portable electronic device, such as a mobile phone, and the image sensor is electrically connected with a circuit board of the mobile phone for receiving power. When taking pictures, the light rays reflected from an image object (not shown) pass through the lens elements. The lens elements focuses the light rays, after which, the light rays arrive at the image sensor 14. The image sensor 14 will transform the light signal to an electronic signal, permitting the storage of the image information in a memory of the digital camera. As such, the photographic process is finished. If the image should prove not to be clear enough (i.e. out of focus), the user may rotate the flange 42 of the barrel 40 by hand. The barrel 40 rotates relative to the sleeve 20, and, the elastic element 30 of the sleeve 20 breaks out from one of the apertures 48 of the barrel 40 so as to slide the next aperture 48. At the same time, the flange 42 of the barrel 40 causes the rods 50 to rotate. The rods 50 incline so that the rods 50 make the barrel 40 slide axially relative to the sleeve 20. Accordingly, distance between the barrel 40 and the image sensor 14 is changed, thereby resulting in the stable telescopic movement of the barrel 40. The image distance is changed so that a distant object can be imaged in the image sensor. When the image becomes clear, the barrel 40 stops rotating. The barrel 40 is kept in the focusing position because of the limiting influence of the elastic element 30. Thus, the focusing purpose is achieved by changing the distance between the image sensor 14 and the barrel 40.

A main advantage of the digital camera module 100 with a manual focusing function is that the rods 50 drive the telescopic movement of the barrel 40. The elastic element 30 limits reverse rotation when the manual focusing is finished. The manual focusing operation of the digital camera module 100 is simple. In addition, the digital camera module 100 has a compact structure and power-efficient.

In alternative embodiments, the engaging surfaces of the barrel body 44 of the barrel 40 and the sleeve 20 are frictional surfaces having some coefficient of friction. When force is applied, the barrel 40 will rotate and slide along an axis of the sleeve 20 under the rods 50. When the force is stopped, the barrel 40 is kept in the focusing position owing to the friction. In that case, the elastic element 30 and the apertures 48 may be omitted.

In a still further alternative embodiment, the base seat 11 may be a cylinder. The sleeve 20 and the base seat 10 may be molded together as a whole during manufacture.

In a still further alternative embodiment, the sleeve 20 may be omitted, and a middle portion of the base 10 can be recessed to form the cavity therein. The barrel 40 is directly received in the cavity and can rotatably and slidably engages with the inner periphery wall of the base 10.

As described above, the preferred embodiment provides a digital camera module 100 with a manual focusing function for devices such as mobile phones, which has both simplicity and ease of use. It is, however, to be understood that the digital camera module 100 could potentially be useful in other applications in which it may be desirable to allow incoming light to be adjusted so as to attain clear image.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A digital camera module, comprising:
   a base having an elastic element mounted on an inner wall thereof,
   a barrel having an outer wall defining more than one aperture, the elastic element engaging into one of the apertures when the barrel movably received in the base; and
   at least one rod, the rod being connected with the barrel and the base so that when the barrel is rotated relative to the base, the barrel is caused to slide axially relative to the base.

2. The digital camera module as claimed in claim 1, wherein a portion of the base is recessed to form a cavity therein, the cavity is defined by an inner periphery sidewall and a bottom wall, the barrel is received in the cavity.

3. The digital camera module as claimed in claim 2, wherein the elastic element is disposed at the inner periphery sidewall.

4. The digital camera module as claimed in claim 1, wherein the base includes a base seat, and a sleeve mounted to the base seat, the barrel is received in the sleeve.

5. The digital camera module as claimed in claim 4, wherein the elastic element is disposed in the sleeve.

6. The digital camera module as claimed in claim 4, wherein engaging surfaces of the sleeve and the barrel are frictional surfaces.

7. The digital camera module as claimed in claim 1, wherein each rod has two bent ends extending in a same direction.

8. The digital camera module as claimed in claim 7, wherein the barrel has a first pin hole defined in a top of the barrel, the base has a second pin hole defined, and the two connecting ends of each rod connect with the first pin hole and the second pin hole, respectively.

9. The digital camera module as claimed in claim 1, wherein the barrel has a flange and a barrel body formed together, the flange has a through hole defined in a middle thereof, the barrel body is a hollow cylinder, and the through hole communicates with the barrel body.

10. The digital camera module as claimed in claim 9, wherein the flange has a second pin hole defined on a periphery wall thereof.

11. The digital camera module as claimed in claim 10, wherein the base seat is a rectangle, and includes two opposite symmetrical end walls and two opposite symmetrical sidewalls, each sidewall has a first pin hole defined in a middle thereof.

12. A digital camera, comprising:
a base having an elastic element mounted on an inner wall thereof, the base including a base seat, and a sleeve mounted to the base seat, the barrel being received in the sleeve, the elastic element being disposed in the sleeve;
a barrel having an outer wall defining more than one aperture, the elastic element engaging into one of the apertures when the barrel being movably received in the base;
at least one rod being connected with the barrel and the base so that when the barrel rotated relative to the base, the barrel caused to slide axially relative to the base; and
an image sensor fixed with the base.

13. The digital camera as claimed in claim 12, wherein a portion of the base is recessed to form a cavity therein, the cavity is defined by an inner periphery sidewall and a bottom wall, the barrel is received in the cavity.

14. The digital camera as claimed in claim 13, wherein the elastic element is disposed at the inner periphery sidewall.

15. A camera module comprising:
a base having a cavity defined therein, the cavity having an inner base wall;
an image sensor disposed in cavity;
a barrel having an outside barrel wall facing the inner base wall, and including at least one lens fixed therein, the lens aligning with the image sensor; an outer surface of the barrel and the inner base wall in the cavity are frictional surfaces;
a plurality of apertures defined in one of the inner base wall and the outer barrel wall;
an elastic element is formed on the other of the inner base wall and the outer barrel wall; and
a connecting member having a first connecting end and a second connecting end, wherein the first connecting end is connected with the barrel, and the second connecting end is fixed relative to the base;
wherein when force is applied, the barrel is able to rotate relative to the base, and when the force is stopped, the barrel is able to be kept in position owing to the friction between the frictional surfaces; the elastic element selectively in the apertures for circumferentially positioning the barrel with respect to the base, and the barrel is caused to slide axially relative to the base by the connecting member.

* * * * *